Jan. 10, 1939. J. M. BRYANT 2,143,593
CONVEYER CHAIN
Filed April 12, 1937 2 Sheets-Sheet 1

Inventor
Jerrus M. Bryant
By L. Donald Myers
Attorney

Jan. 10, 1939. J. M. BRYANT 2,143,593
CONVEYER CHAIN
Filed April 12, 1937 2 Sheets-Sheet 2
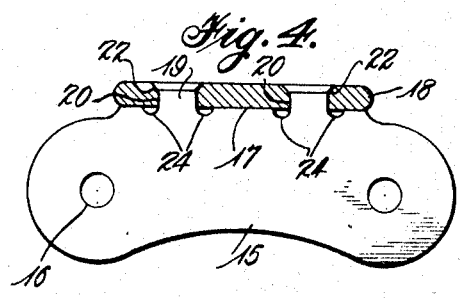
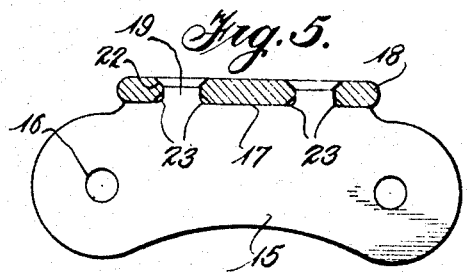
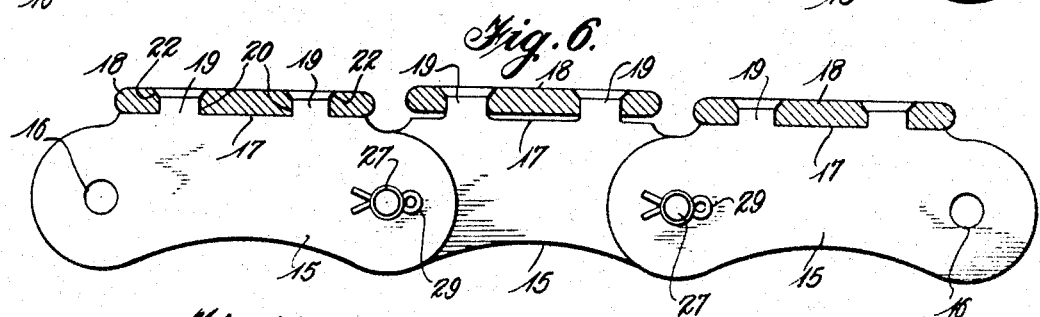
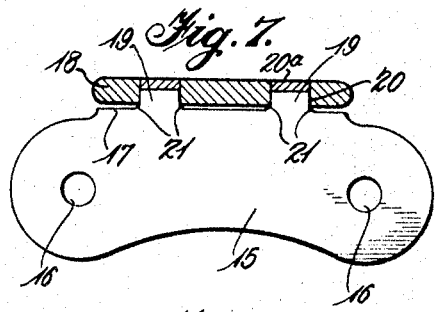
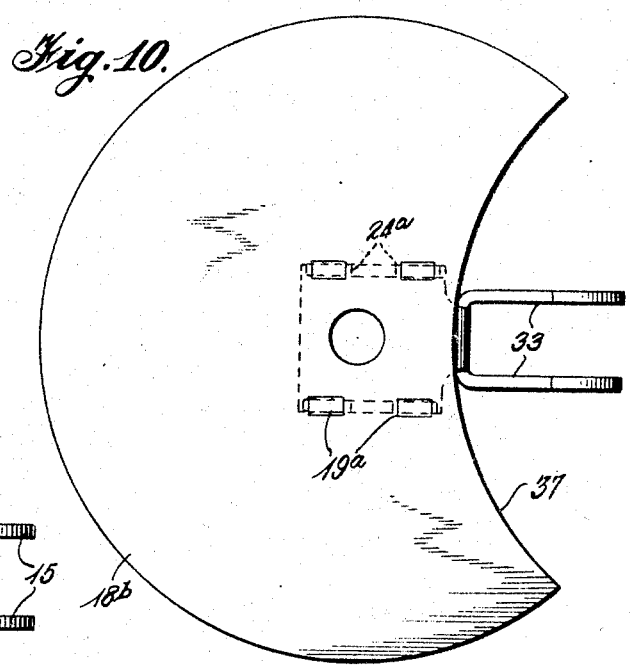
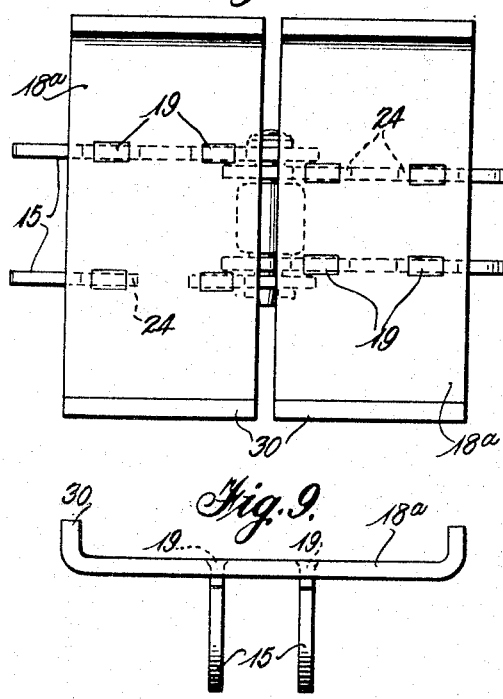
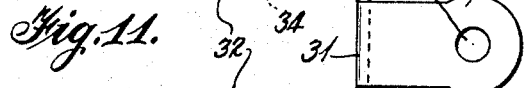
Inventor
Jerrus M. Bryant
By L. Donald Myers
Attorney Patented Jan. 10, 1939

2,143,593

UNITED STATES PATENT OFFICE 2,143,593

CONVEYER CHAIN

Jerrus M. Bryant, Indianapolis, Ind., assignor to Link-Belt Company, a corporation of Illinois Application April 12, 1937, Serial No. 136,500

6 Claims. (Cl. 198—189)

This invention relates to new and useful improvements in conveyer chains and method of making the same.

The need for conveyer chains having flat top carrying surfaces which are accurately aligned with respect to each other, has become very pronounced with the present day use of this type of carrying means for moving comparatively small, slender objects. One such example of this need is found in the handling of small perfumery and lotion bottles in modern bottle filling and stopper applying machines where the bottles are required to be pushed or swept onto and off of the chain without tipping.

The primary object of this invention is to provide a conveyer chain having top carrier surfaces with the surfaces of the respective chain links being properly aligned relative to each other and with said top carrying surfaces accurately spaced with respect to the center line of the pitch holes of the chain links.

Still another important object of the invention is to provide a novel method of attaching top carrier plates to the chain links so that both the carrying and bottom surfaces of the carrier plates will be properly spaced with respect to the center line of the pitch holes of the said links.

A further object of the invention is to provide a conveyer chain link arrangement presenting a substantial contact between the top carrier plate and the surfaces of the chain link to which the carrier plate is attached so that the entire load is applied to the link directly downwardly through the latter at its center rather than being cantilevered to either side of the center.

Another object of the invention is to provide a conveyer chain of the aforementioned type wherein the carrying surfaces of the respective links are always accurately aligned with respect to each other regardless of variations in the amount of load occurring in the chain from the foot end to the head end of the same and the presence or absence of guides or tracks placed beneath the top carrier plates.

Other objects and advantages of the invention will be apparent during the course of the following description.

Figure 1:
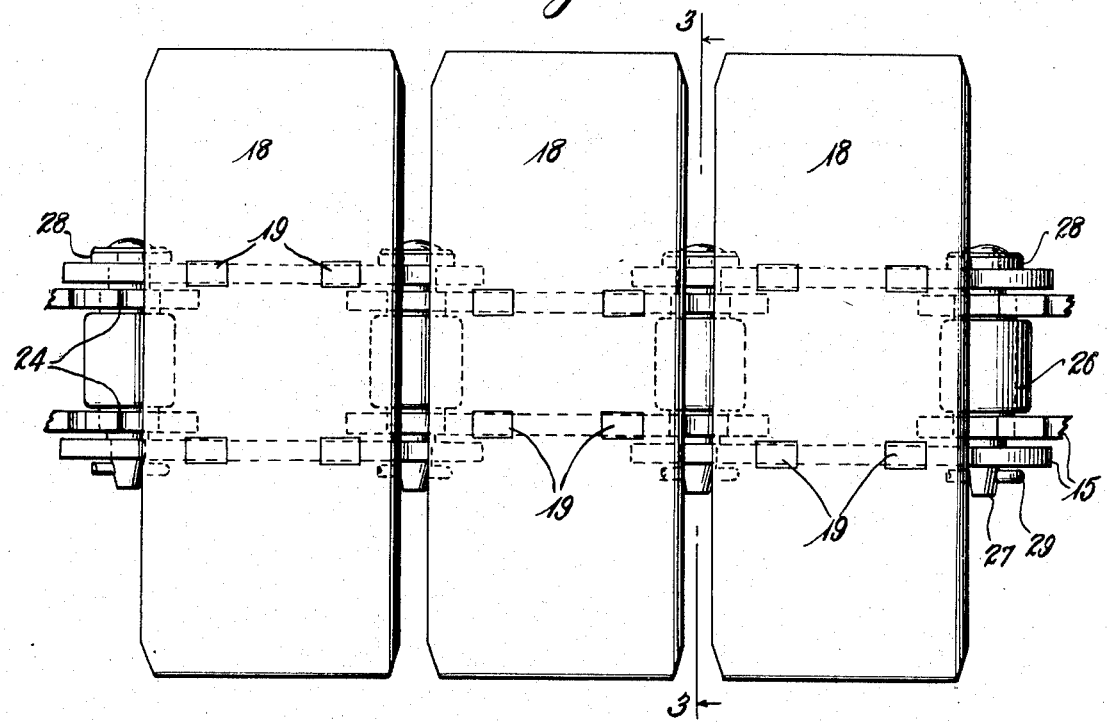
Figure 2:
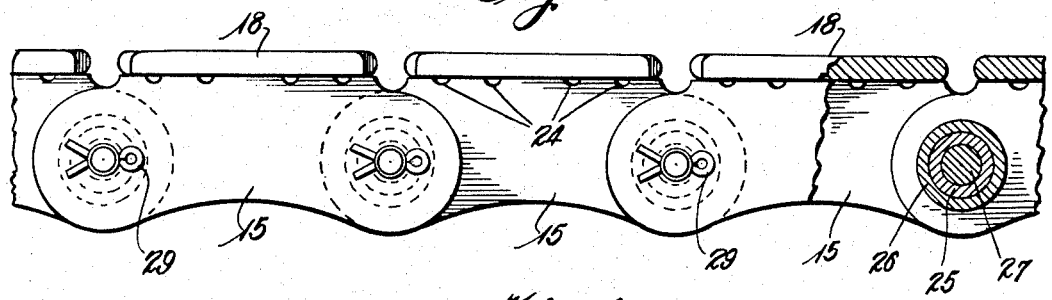
Figure 3:
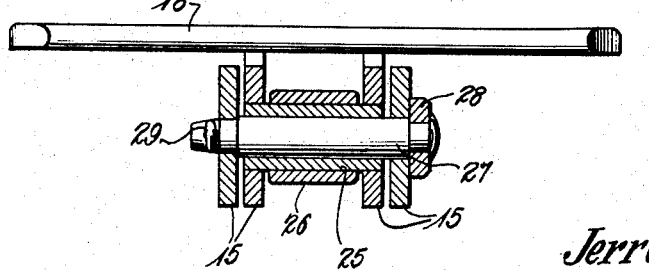

In the accompanying drawings forming a part of this specification, and in which like numerals are employed to designate like parts throughout the same, Figure 1 is a top plan view of a section of a conveyer chain embodying this invention, Figure 2 is a side elevational view of the section of chain illustrated in Fig. 1, Figure 3 is a transverse sectional view taken on line 3—3 of Fig. 1, Figure 4 is a detailed vertical sectional view which illustrates the manner of attaching the top plate to a side plate in the chain structure disclosed in Figs. 1 to 3 inclusive, Figure 5 is a similar view to Fig. 4 of a different form of chain link structure, Figure 6 is a vertical sectional view of a section of a conveyer chain and illustrates a faulty chain construction, the defects of which have been remedied by the construction embodying this invention, Figure 7 is a detail vertical sectional view illustrating a further form of faulty carrier chain link structure, Figure 8 is a top plan view of a section of a carrier chain embodying this invention but including a modified form of carrier plate to that illustrated in Figures 1 to 4, inclusive, Figure 9 is an end elevational view of a carrier chain link of the type disclosed in Figure 8, Figure 10 is a top plan view of a single carrier chain link embodying this invention but of a modified form to that illustrated in Figures 1 to 4 inclusive, 8, and 9, and Figure 11 is a side elevational view of the type of conveyer chain link illustrated in Figure 10.

Before proceeding with a detail description of the features of construction embodied in the type of conveyer chains disclosed in the drawings which illustrate the invention, it is believed that a brief description of the problems encountered and solved during the development of this invention will enable persons skilled in the art to better appreciate the advantages and desirable features of construction possessed by the carrier chain designs which embody the invention.

As stated above, the present-day need for conveyer chains having top carrying surfaces, wherein the said carrying surfaces of the respective chain links are accurately aligned, is very pronounced. Although this invention deals primarily with the problem of providing a conveyer chain structure having flat top carrier plates onto and off of which bottles may be pushed or swept, the invention in its broadest aspect is not limited to conveyer chains for this particular use. More problems are encountered in constructing a conveyer chain suitable for handling bottles, or other slender articles which have to be conveyed in an up-ended position, and any conveyer chain which will be suitable for use in handling bottles will be entirely satisfactory for handling other objects which may be carried on top carrier plates. This description, therefore, will be directed to bottle conveyer problems.

It must be kept in mind that bottle conveyers are required to handle from the smallest type of sample bottle to some of the larger bottles, both in connection with ordinary conveyer work and in bottle filling machines. In such service, certain types of machines employ mechanisms used to sweep the bottles from the carrying surfaces of the top plates onto other surfaces without tipping. The top carrying surfaces of the various link plates, therefore, must be maintained level, and the surfaces of the various links must be accurately aligned with respect to each other. If the carrying surfaces are not level, slender bottles will tip over during their movement by the conveyer. If the various top carrying surfaces of the respective links are not accurately aligned, mechanism employed for sweeping bottles onto and off of the carrying plates will be interfered with by the top plates which are carried higher than properly positioned plates.

There are variations in the actual conditions of operation of this type of chain. It will be appreciated that when a conveyer chain is stretched out under load, each of the respective link connections tends to center itself with respect to the joints of the chain and in turn the pitch holes of the links. Also there is a variation in the amount of load occurring in the chain, graduating from zero at the foot end of the conveyor to a maximum at the head end of the conveyer where the drive unit is located. Under such a condition, one can appreciate that as the chain approaches the head end of the conveyer, the tension in the chain becomes greater, and the tendency for each adjacent pitch hole to center itself with respect to the joint parts becomes more pronounced so that even though supports were provided for the under side of the top plates on each side of the chain, this centering action would create an unevenness of plates on their top surfaces or a misalignment of the top carrying surfaces of the plates. It is believed, therefore, that to provide a conveyer chain wherein the top surfaces of the various carrier plates are accurately aligned with respect to each other, these top carrying surfaces must be uniformly and accurately spaced with respect to the pitch holes of the various links.

The alignment of the top surfaces of the carrier plates through the lighter loaded sections of the conveyer will depend upon guides or tracks placed on the under side of the top plates. It will be appreciated, therefore, that the bottom surfaces of the top plates also must be accurately positioned with respect to the center lines of the pitch holes in the respective links. To maintain an accurate alignment of both the top and bottom surfaces of the various carrier plates, it will be appreciated that all of the top plates must be maintained of uniform thickness. Some attempts have been made in the past to provide an accurate alignment of the top carrying surfaces of the plates without recognizing the necessity of maintaining accurate alignment of the bottom surfaces of the top plates. One such attempt consisted of grinding the top surfaces of the plates after assembly of the chain to establish a uniform spacing of the top surfaces from the pitch holes of the links.

It further can be seen that if there exists any variation in the distance between the bottom of a carrier plate and the true working center line of the chain, the plate would not rest evenly on supporting guides or tracks and, when loaded, would be likely to cause tipping of the articles. Grinding the top surfaces of the plates to accurately align the same would not cause misaligned bottom surfaces to properly cooperate with supporting guides or tracks.

Conveyer chains having top carrier plates have for many years been formed of cast malleable links or links formed of spaced side plates with laterally projecting attachment ears or lugs to which the top plates were secured by rivets. Due to inaccuracies encountered in manufacturing cast malleable links, it is impossible to produce a conveyer chain in which the top carrying surfaces of the various links will be accurately aligned. Links formed of side plates having laterally projecting attachment ears must be formed by bending the ears relatively to the main bodies of the side plates as a separate step from the initial blanking of the link plates. It is impossible to effect uniform bending of these attachment lugs or ears with respect to the plate bodies. A conveyer chain formed by riveting top plates to such attachment ears or lugs, therefore, cannot be produced with the top carrying surfaces of the plates accurately aligned with respect to each other.

Having in mind the previously mentioned principle that the only way in which a conveyer chain could have both the top and bottom surfaces of the carrier plates aligned accurately with respect to each other was by uniformly positioning the top carrier plates relatively to the pitch holes of the links, it was decided that for the most accurate construction, the links should be formed of separate side plates produced in a combination blanking and perforating operation and with the top carrier plates attached to the side plates so that they would bear against surfaces of the side plates which were accurately spaced from the axes of the pitch holes formed in the link side plates.

Figure 7 illustrates the first type of link developed in an endeavor to carry out the principles of construction decided upon. This chain link structure consisted of two parallel side plates 15, only one of which appears in this figure, with each side plate being produced by a combination blanking and perforating operation. Each side plate was provided with the two pitch holes 16. The top edge 17 was to constitute a seat for the top plate 18. In producing these side plates 15 by a combination blanking and perforating operation, it was possible to accurately and uniformly locate the top edge surface 17 of each side plate with respect to the axes of the pitch holes 16. For the purpose of permanently attaching the top plate 18 to the parallel side plates 15, a pair of upstanding lugs 19 was formed to project from each side plate surface 17. The top plate 18 was formed with apertures 20 to tightly receive the side plate lugs 19. It will be seen that the lugs 19 are shorter than the apertures 20. After positioning the top plate 18 on a pair of side plates 15, the top plate was welded to the lugs 19, the weld metal 20a filling the apertures 20, and the entire link assembly finished by grinding off the surplus metal 20a deposited on the top surface of the plate 18 during the welding operation to provide a smooth flush surface.

Two very objectionable defects were discovered in this link structure. The first defect resulted from distortion of the link assembly by the heat developed during the welding operation. The second defect resulted from variations in the fillets occurring at the point 21 where the lugs 19 join the top edge surface 17 of the side plates 15. This fillet variation resulted from wearing away of the sharp portions of the dies which were supposed to form the sharp angles between the lugs 19 and the edge surface 17. As these sharp portions of the cutting tools wore, the radii of the fillets increased. Any fillet formation occurring at the points 21 would prevent the top plate 18 from seating upon the edge 17 of a side plate, and, of course, as the fillet radii increased, the top plates were held greater distances from the side plate edge 17.

The defect resulting from distortion caused by the welding heat was first overcome. Figure 6 illustrates the structural change which overcame this defect. This structural change consisted of countersinking the upper ends of the apertures 20 which were formed in the top plates 18. This countersinking of the ends of the apertures is illustrated at 22. This countersinking of the apertures permitted longer lugs 19 to be used and their end portions to be riveted or peened down into these aperture enlargements. This method permitted the top plates 18 to be permanently and rigidly secured to the side plates without the use of any heat which would result in distortion of the links.

The defect produced by variations in fillet radii still existed, and Figure 6 clearly illustrates how this fillet variation prevented accurate alignment of the top and bottom surfaces of the top plates 18. Of the three links illustrated in Figure 6, the two end links are properly seated upon the edge 17 of the side plates 15 while the middle top plate is held out of engagement with the side plate edge 17 by fillets 21.

The first method adopted to overcome the defect resulting from variations in fillet radii is illustrated in Figure 5. This structural change consisted of countersinking both ends of the apertures 20 formed in the top plates 18. The additional or inner countersunk end portions are designated in Figure 5 by the reference character 23. This structural modification permitted the top plates 18 to be completely seated upon the upper edges 17 of the side plates. However, to make certain that the countersunk ends 23 of the apertures 20 would accommodate the greatest permissible variation in fillet radii, this inner countersinking had to extend a considerable distance into the top plate apertures. With the apertures 20 countersunk at both ends, the straight side wall portions of the apertures 20 were reduced to such an extent that the desired tight fit between the lugs 19 and the apertures 20 over an appreciable area was destroyed.

The final solution for this difficulty of misalignment of the top plates due to fillet variations is illustrated in the structure disclosed in Figure 4. It was decided that instead of providing fillet relief in the top plate apertures, fillet relief or clearance should be provided in the side plates at the points where the lugs 19 joined the top edge 17 of a side plate. The side plate blanking tools, therefore, were shaped to provide or form the fillet clearance producing grooves 24. These grooves could be made deep enough to allow for any amount of wearing away of the blanking tools at the points where these grooves were formed up to a point where the wear on the cutting tools rendered the latter unsuitable for further use.

It will be appreciated that the chain link assembly disclosed in Figure 4 permits the top and bottom surfaces of all top carrier plates to be accurately and uniformly positioned with respect to the axes of the pitch holes formed in the side plates. This is due to the fact that the top plates are always permitted to be firmly and tightly seated against the upper edges 17 of the side plates.

Figures 1 to 3, inclusive, illustrate a section of a conveyer chain formed of links of the type illustrated in Figure 4. Of course, in a chain assembly where the side plates are straight or flat and not reversely bent lengthwise, the side plates of adjacent links must be spaced different distances so that the side plates of one link may be positioned between the side plates of its two adjacent links.

Figure 3 discloses the inner side plates 15 as being secured to the ends of a sleeve or bushing 25. This sleeve or bushing has rotatably mounted upon the same a sprocket tooth engaging roller 26. The outer link side plates 15 are pivotally connected to the inner link plates by means of a chain pin 27 which is rotatably received within the bore of the sleeve or bushing 25. A washer 28 is secured to one end of the chain pin 27 while a cotter pin 29 is provided for the remaining end of the chain pin. This assembly permits the various chain links to be detachably connected.

It will be noted that the top plates 18, illustrated in Figures 1 to 3 inclusive, are flat or unobstructed throughout their entire top area. This type of top plate is especially adapted for use in conveying bottles through machines having mechanism adapted to sweep the bottles onto and off of the conveyer chain.

Figures 8 and 9 illustrate a type of chain assembly which embodies all of the desirable structural features described in connection with the disclosure of Figure 4 but differs from the link structure of this figure and the disclosure of Figures 1 to 3, inclusive, by a modification in the formation of the top plates. The top plates 18a of Figures 8 and 9 have upstanding side edges or flanges 30. The disclosures of Figures 8 and 9, therefore, indicate the adaptability of the features of eliminating fillet interference and distortion by welding to different forms of link top plates.

Figures 10 and 11 illustrate a type of link which is adapted for assembly in a chain which is capable of bending or traveling around sprockets arranged at right angles to each other; i. e., sprockets which are arranged with their axes extending horizontally to define the head and foot ends of a conveyer in combination with additional sprockets arranged with their axes extending vertically and functioning to cause bending of the conveyer around corners while remaining in a common or single horizontal plane.

The link structure disclosed in Figures 10 and 11 consists of a link 31 having oppositely extending pairs of side plates 32 and 33 with pitch holes 34 and 35 formed in the respective pairs of side plates to receive chain pins having axes arranged at right angles to each other.

The upper plate 32 of each link of the type shown in Figures 10 and 11 is formed with a pair of upstanding flanges 36 which have formed thereon lugs 19a. Fillet relief grooves 24a are formed at the base of each lug 19a. The top plate 18b employed with this type of lug is provided with a peripheral recess 37 but is otherwise of disc formation. This recess 37 is adapted to receive the convexed edge portion of the next adjacent top plate disc. As is clearly illustrated in Figure 11, the upper ends of the apertures formed in the top plate 18b have the countersinking feature disclosed in detail in Figure 4 to permit the outer end portions of the lugs 19a to be peened or riveted down into the enlarged end portions of the apertures.

Although the links disclosed in Figures 10 and 11 are capable of being formed in a combination blanking and perforating operation, the blanks have to be bent or shaped to form the oppositely extending pairs of side plates 32 and 33 and the upstanding parallel flanges 36. This type of link, therefore, does not possess the same degree of accuracy of alignment of the top plate surfaces as the link structure disclosed in Figures 1 to 4, inclusive.

It is to be understood that variations in the shape, size, and arrangement of parts in the preferred examples of my invention may be resorted to without departing from the spirit of the invention or the scope of the subjoined claims.

Having thus described my invention, I claim:

1. In a conveyer chain, a plurality of chain links pivotally connected together by chain pins, each of said links having an edge bearing surface with the edge surfaces of all of said links uniformly positioned with respect to the axes of the chain link pitch holes, a carrier plate for each link flatly bearing against its edge surface, means for securing said carrier plates to their respective links comprising a lug projecting from each link edge surface and received in an opening formed in the carrier plate, and grooves for eliminating fillet interference between said carrier plates and the chain links where the lugs join the link edges.

2. In a conveyer chain, a plurality of chain links pivotally connected together by chain pins, each of said links having an edge bearing surface with the edge surfaces of all of said links uniformly positioned with respect to the axes of the chain link pitch holes, a carrier plate for each link flatly bearing against its edge surface, and means for securing said carrier plates to their respective links comprising a lug projecting from each link edge surface and received in an opening formed in the carrier plate, said links each having fillet relief grooves at the base of its lug.

3. In a conveyer chain, a plurality of chain links pivotally connected together by chain pins, each of said links having an edge bearing surface with the edge surfaces of all of said links uniformly positioned with respect to the axes of the chain link pitch holes, a carrier plate for each link flatly bearing against its edge surface, and means for securing said carrier plates to their respective links comprising a lug projecting from each link edge surface and received in an opening formed in the carrier plate, said carrier plate opening having its outer end countersunk and said lug having its outer end peened down into said countersunk end of the opening, said links each having fillet relief grooves at the base of its lug.

4. In a conveyer chain, a chain link comprising a pair of parallel side plates each having a pair of pitch holes and a top edge bearing surface, the top edge surfaces of both of said side plates being parallel with and uniformly spaced from a plane passing through the axes of their respective pitch holes, each of said top edge bearing surfaces having a lug projecting therefrom with fillet relief grooves at the base of said lug, and a carrier plate having openings to receive said lug to secure said plate in engagement with said top edge bearing surfaces.

5. In a conveyer chain, a chain link comprising a pair of parallel side plates each having a pair of pitch holes and a top edge bearing surface, the top edge surfaces of both of said side plates being parallel with and uniformly spaced from a plane passing through the axes of their respective pitch holes, each of said top edge bearing surfaces having a lug projecting therefrom, a carrier plate having openings to receive said lugs to secure said plate in engagement with said top edge bearing surfaces, and grooves for eliminating fillet interference with said carrier plate where the lugs join with said edge bearing surfaces.

6. In a conveyer chain, a plurality of chain links pivotally connected together by chain pins, each of said links comprising side plates arranged in spaced parallelism with each plate having an edge bearing surface, the edge bearing surfaces of all of said plates being uniformly positioned with respect to the axes of the chain link pitch holes, one or more lugs projecting from the top edge of and lying in the same plane as each side plate with each of said lugs being equal in width to the width of a side plate and being of rectangular shape in transverse section, said side plates each having fillet relief grooves at the base of each lug, and a top plate for each link having a separate opening for each lug which is shaped to tightly receive the same, said top plate being seated on the bearing surfaces of said side plates and secured thereto by the lugs and their cooperating openings.

JERRUS M. BRYANT.